United States Patent

Takahashi et al.

(10) Patent No.: US 6,977,388 B2
(45) Date of Patent: Dec. 20, 2005

(54) METHOD FOR READING RADIATION IMAGE INFORMATION

(75) Inventors: Kenji Takahashi, Kanagawa (JP); Satoshi Arakawa, Kanagawa (JP)

(73) Assignee: Fuji Photo Film Co., Ltd., Kanagawa (JP)

(*) Notice: Subject to any disclaimer, the term of this patent is extended or adjusted under 35 U.S.C. 154(b) by 0 days.

(21) Appl. No.: 10/109,898

(22) Filed: Apr. 1, 2002

(65) Prior Publication Data
US 2002/0139945 A1 Oct. 3, 2002

(30) Foreign Application Priority Data
Mar. 30, 2001 (JP) .............................. 2001-100097

(51) Int. Cl.⁷ ............................................... H04N 1/46
(52) U.S. Cl. .................................. 250/584; 250/484.4
(58) Field of Search ................................ 250/584, 585, 250/586, 588, 581, 591, 484.4

(56) References Cited

U.S. PATENT DOCUMENTS

| | | | |
|---|---|---|---|
| 4,446,487 A * | 5/1984 | Horikawa | 358/448 |
| 4,876,452 A * | 10/1989 | Horikawa | 250/585 |
| 5,386,124 A * | 1/1995 | Yasuda et al. | 250/585 |
| 6,455,868 B1 * | 9/2002 | Arakawa | 250/588 |
| 2001/0035502 A1 * | 11/2001 | Arakawa et al. | 250/484.4 |

* cited by examiner

Primary Examiner—Otilia Gabor
(74) Attorney, Agent, or Firm—Sughrue Mion, PLLC

(57) ABSTRACT

A method for reading radiation image information from a radiation image storage panel in which a radiation image information is recorded is performed by the steps of moving the storage panel on a plane of the storage panel with scanning on the storage panel in a direction perpendicular to the movement of the storage panel a pulse of stimulating light having a duty of 0.01 to 0.5; continuously detecting photoelectrically a stimulated emission appearing from the storage panel on the scanned surface and/or its back surface to obtain electric signals; sampling the electric signals at a timing synchronous with the scanned stimulating light pulse; and obtaining signals of the radiation image information from the sampled electric signals.

8 Claims, 2 Drawing Sheets

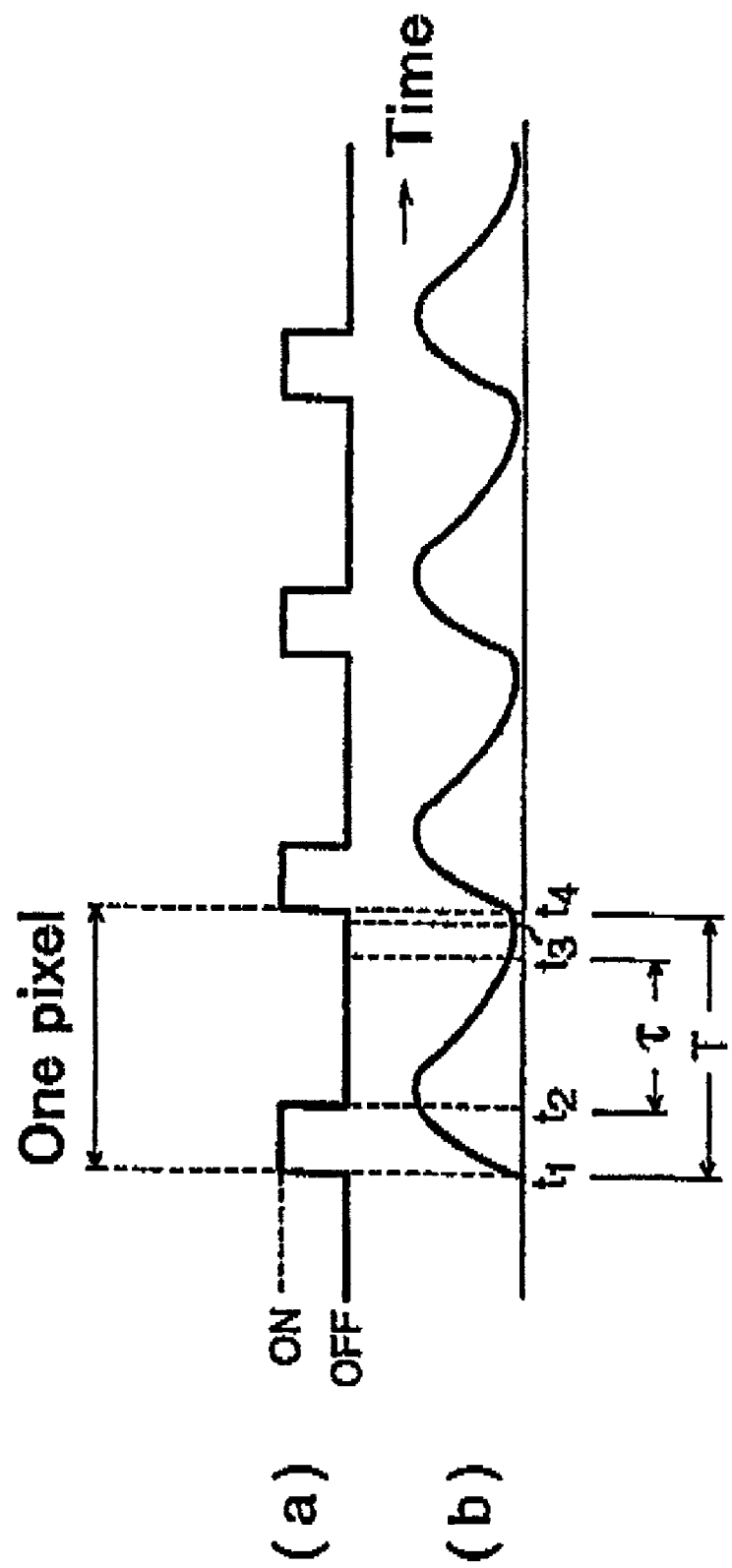

METHOD FOR READING RADIATION IMAGE INFORMATION

FIELD OF THE INVENTION

The present invention relates to a method for reading radiation image information recorded in a radiation image storage panel comprising stimulable phosphor.

BACKGROUND OF THE INVENTION

When the stimulable phosphor is exposed to radiation such as X-rays, it absorbs and stores a portion of the radiation energy. The stimulable phosphor then emits stimulated emission according to the level of the stored energy when the phosphor is exposed to electromagnetic wave such as visible light or infrared rays (i.e., stimulating light).

A radiation image recording and reproducing method utilizing the stimulable phosphor has been widely employed in practice. The method employs a radiation image storage panel comprising the stimulable phosphor, and comprises the steps of causing the stimulable phosphor of he storage panel to absorb radiation energy having passed through an object or having radiated from an object; sequentially excite the stimulable phosphor with a stimulating light to emit stimulated light; and photoelectrically detecting the emitted light to obtain electric signals giving a visible radiation image. The storage panel thus treated is subjected to a step for erasing radiation energy remaining therein, and then stored for the use in the next recording and reproducing procedure. Thus radiation image storage panel can be repeatedly used.

The radiation image storage panel (often referred to as stimulable phosphor sheet) has an elemental structure comprising a substrate and a stimulable phosphor layer provided thereon.

The phosphor layer is generally formed by coating a dispersion of phosphor particles in a binder solution on the substrate and drying the coated dispersion on the substrate, and therefore comprises a binder and phosphor particles dispersed therein. Also known is a phosphor film of stimulable phosphor which is vapor-deposited on the substrate.

In U.S. patent application Ser. No. 09/749,623, a modified radiation image recording and reproducing method is described. In the method, a function for absorbing radiation and a function for storing the radiation energy are separated, while a stimulable phosphor used in the known radiation image recording and reproducing method performs both functions. For that purpose, a radiation image storage peel comprising at least a stimulable phosphor (for storage) and a fluorescent screen comprising a fluorescent phosphor which absorbs radiation and emits ultraviolet or visible light are used in combination. The method comprises the steps of exposing the fluorescent screen to a radiation having passed through an object or having radiated form an object and converting the radiation into ultraviolet or visible light by the fluorescent phosphor; having the ultraviolet or visible light absorbed by the stimulable phosphor; sequentially scanning a stimulating light on the stimulable phosphor of the storage panel to emit a stimulated emission; and photoelectrically detecting the emitted light to obtain electric signals of the radiation image.

The above-described radiation image recording and reproducing method is advantageous in that the obtained radiation image signals can be subjected further to processings such as gradation processing and frequency processing to obtain a reproduced radiation image having various informations from X-ray examination using a limited radiation dose.

Heretofore, the stimulated emission produced in the radiation image information recorded in the radiation storage panel is read by a photomultiplier or a photoelectric element having a large emission-receiving surface after scanning the stimulating light in such manner that the stored radiation image is divided into plural pixels. This method is named "dot scanning". Also known is a "line scanning" or "linear scanning" in which the stimulating light is scanned linearly on the radiation image storage panel and detecting the stimulated emission, and the pixel division is performed by utilizing a light-receiving element such as a two-dimensional solid-state imaging element or a semiconductor line sensor and producing time series image signals in an electric circuit. The line scanning is advantageous for shortening the period for reading the stimulated emission, down-sizing the reading apparatus, and attaining cost-reduction.

From the viewpoint of obtaining a reproduced radiation image of high quality, it has been proposed to employ a pulse of stimulating light in which the stimulating light is applied intermittently onto the radiation Image storage panel.

Japanese Patent Publication 5-60709 describes a radiation image-reading procedure detecting only the stimulated emission which is emitted just after the pulse of stimulating light is applied. This means that noise and deterioration of sharpness which are caused by lately produced stimulated emission (after-glow) are reduced.

Japanese Patent Publication 3-69086 describes an apparatus using no filter for separating the stimulating light from the stimulated emission. The procedure described in the publication is characteristic in that an image data (in the form of electric signal) provided by the stimulated emission produced in the period in which the pulse of stimulating light is not applied only is sampled, so as to remove the adverse effect of the stimulating light.

U.S. Pat. Nos. 5,892,234 and 5,962,857 describe a method for determining an unknown radiation dose by measuring a stimulated emission (integral value) at a certain period after the application of pulse of stimulating light.

Japanese Patent No. 2,557,265 describes a method for obtaining a radiation image information of a specific portion of the object by utilizing plural radiation image storage panels having different response rate and radiation absorbing capacity. The procedure is performed by sampling the electric signals of the stimulated emission at timings in consideration of respective response rates, and subjecting the obtained image signals to subtraction processing.

Thus, the radiation image-reading rate depends on and limited by the response rate of the stimulable phosphor contained in the radiation image storage panel. The response rate (or emission life) is defined by a period from the time starting the application of stimulating light to the time at which the level of stimulated emission reaches $A \times (1-1/e)$ in which A stands for an emission level produced under stationary state, or a period from the time starting the application of stimulating light to the time at which the level of stimulated emission reaches $A \times (1/e)$. In other words, if the employed phosphor shows a low response rate, an unsharped radiation image is produced unless the reading time for one pixel is prolonged. This means to read the recorded radiation image slowly.

In the continuous stimulation in which a stimulating light is applied onto the radiation image storage panel continuously, the stimulating light having weak energy, Accordingly, the strength of stimulated emission does not decrease until the stimulable phosphor in the last area of one pixel receives the stimulating light. Therefore, the lately produced stimulated emission gives adverse effect to the reading of the subsequent pixel.

SUMMARY OF THE INVENTION

The present inventors have noticed that the adverse effect by the lateness of the production of stimulated emission can be reduced by utilizing stimulation in the form of pulse in place of the continuous stimulation but continuously detecting the stimulated emission regardless that the stimulating light is applied or not, This is because there is no component to produce stimulated emission in each pixel at the period of applying no stimulating light.

Accordingly, the present invention has an object to provide a method for reading radiation image information from a radiation image storage panel at an increased rate which is favorably employable for medical radiography for diagnosis, industrial radiography, and fluoroscopy.

The invention resides in a method for reading radiation image information from a radiation image storage panel comprising stimulable phosphor in which a radiation image information is recorded which comprises the steps of:

moving the radiation image storage panel on a plane of the storage panel with scanning on the storage panel in a direction perpendicular to the movement of the storage panel a pulse of stimulating light having a duty in the range of 0.01 to 0.5;

continuously detecting photoelectrically a stimulated emission appearing from the storage panel on the scanned surface and/or a back surface thereof to obtain electric signals;

sampling the electric signals at a timing synchronous with the scanned pulse of stimulating light; and obtaining signals representing the radiation image information from the sampled electric signals.

In the present specification, the term "duty" means a ratio of the stimulating period to the period of one pulse (namely, the period of application of stimulating light plus the period of applying no stimulating light).

It is preferred that the sampling period T for one pixel satisfies the following conditions:

$$0.7 \times \tau \leq T \leq 1.7 \times \tau \text{ (specifically, } 0.7 \times \tau \leq T \leq 1.3 \times \tau)$$

in which τ stands for a response rate of the stimulable phosphor.

In the method of the invention, the pulse of stimulating light can be applied onto the storage panel to form plural dots, and the stimulated emissions appearing from the storage panel are detected sequentially. In this method, the stimulated emissions appearing from the storage panel can be sequentially detected by means of a photoelectric multiplier.

Alternatively, the pulse of stimulating light can be applied onto the storage panel to form linear and the stimulated emission appearing from the storage panel is one-dimensionally detected. In this method, the stimulated emission appearing from the storage panel can be one-dimensionally detected by means of a line sensor comprising plural photoelectric conversion elements aligned linearly.

The photoelectrically detected electric signals can be subjected to signal processing utilizing a low-pass filter or an integration circuit.

BRIEF DESCRIPTION OF DRAWINGS

FIG. 2 graphically indicates a pulse of stimulating light to be applied to the radiation image storage panel, and variation of amount of stimulated emission appearing from the storage panel in the course of lapse of time.

DETAILED DESCRIPTION OF THE INVENTION

Figure 1:
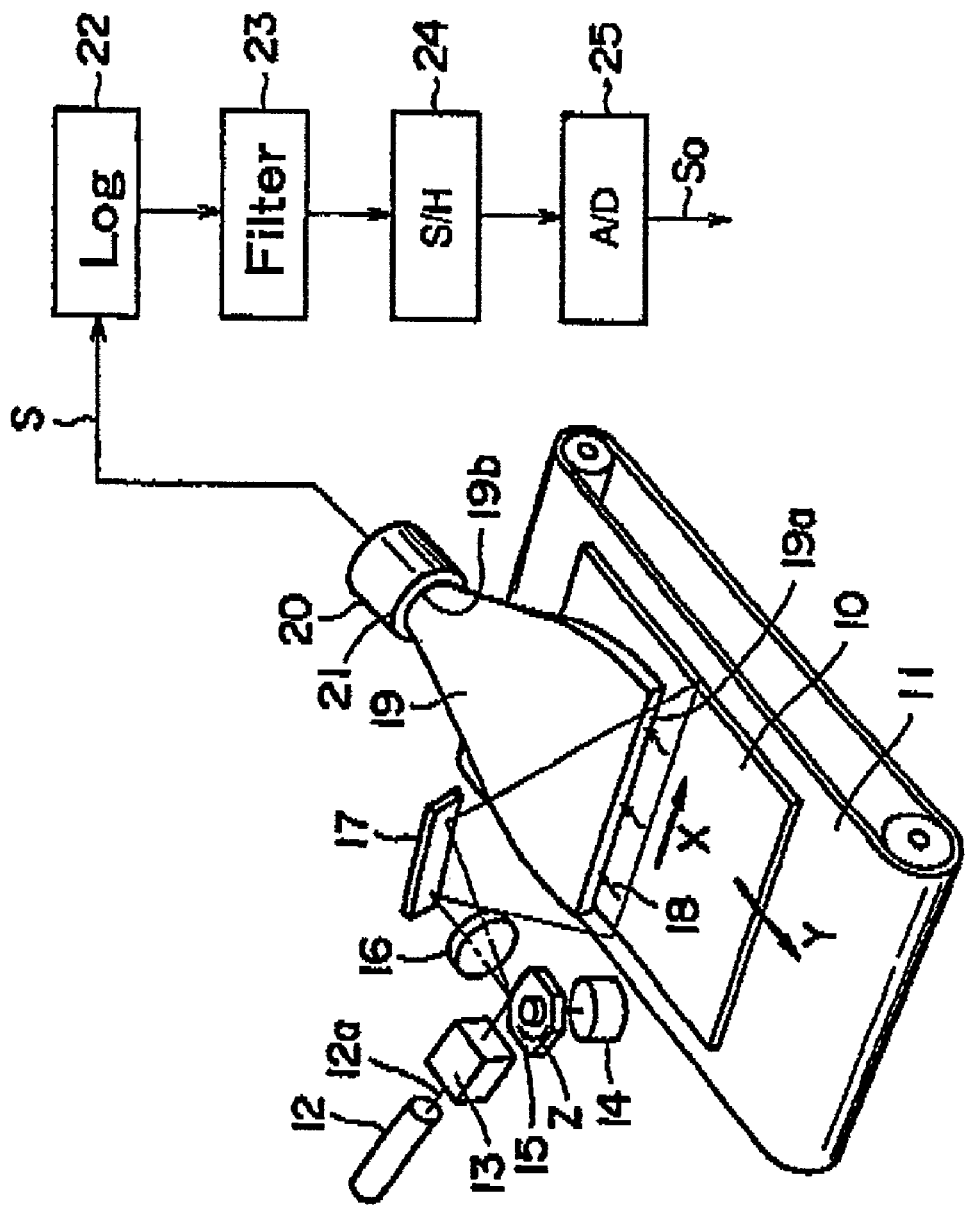
FIG. 1 indicates an apparatus for reading radiation image information from a radiation image storage panel.

The method for reading radiation image information according to the invention is described below, referring to "dot scanning".

FIG. 1 illustrates an apparatus for reading radiation image information according to the invention.

A radiation image storage panel 10 which is before-hand exposed to radiation (such as X-rays) having passed through an object, and hence in which radiation image information of the object is recorded and stored in the storage panel 10 is placed on the apparatus of FIG. 1. The radiation image storage panel is generally composed of a substrate, a phosphor layer of stimulable phosphor such as BaFBr:Ea or CsBr:Eu, and a protective film. Radiation image storage panels of various types have been known.

The storage panel 10 is placed on the conveyor 11 such as a endless belt. The endless belt 11 moves in the direction show by an arrow Y, an hence the storage panel 10 is moved.

A stimulating light 12a such as a laser light is generated by a light source 12 and carted into a stimulating light in the pulse form in an acoustic optical modulator (ACM) 13. The pulse of stimulating light is reflected on a rotating polygonal mirror 15 which is rotated in the direction of Z by a motor 14, and polarized. The polarized stimulating light passes a converging lens 16 (e.g., fθ lens) to reach a mirror 17. The light is then changed its path On the mirror 17 to advances to the surface of the storage panel 10. The pulse of stimulating light is scanned on the storage panel 10 in the direction of X which is essentially perpendicularly to the direction Y for the movement of the storage panel 10. The storage panel emits a light (stimulated emission) 18 stimulated by the pulse of stimulating light 16a at the positions which receive the stimulating light.

The stimulated emission 18 is guided by a light-collecting guide 19 and the photoelectrically detected by a photomultiplier 20. The light-collecting guide 19 is made of light-transmitting material such as acryl resin and has a structure in which a light-receiving linear front edge 19a is connected to a circular light-transmitting rear edge 19b via a stimulating light cut filter 21. The light-transmitting rear edge 19b is connected to a receiving face of the photomultiplier 20. The stimulated emission 18 passing the front edge 19a advances in the light-collecting guide with repeated total reflection. The stimulated emission 18 passes the rear edge 19b and is received by the photomultiplier 20. The stimulated emission 18 hang the tradition age information is then processed in the photomultiplier 20 and converted into electric signals.

The light-receiving face of the photomultiplier 20 has a stimulating light cut filter 21 which allows passage of stimulated emission while shielding the stimulating light. A small portion of the stimulating light 16a which has entered the light-collecting guide 19 is removed at the cut filter 21.

FIG. 2-(a) graphically indicates a variation of the pulse of stimulating light at a lapse of time, and FIG. 2-(b) graphically indicates variation of amount of stimulated emission emitted by the radiation image storage panel. In FIG. 2, a pulse of rectangular shape is illustrated. However, other pulses such as a pulse of sine wave or a pulse of triangular wave can be optionally employed.

As is understood from FIG. 2, the stimulating light in the form of pulse is generally applied to the storage panel at once in one pixel, and the detection of the stimulated emission is continuously performed regardless that the stimulating light pulse is applied or not (on/off) to the storage panel.

According to the invention, the duty $[(t_2-t_2)/(t_4-t_1)]$ is determined in the range of 0.01 to 0.5, preferably 0.05 to 0.2. If the storage panel is to be stimulated by the pulse stimulation at an energy equivalent to the conventionally employed continuous stimulation, the stimulating light in the form of pulse should have energy higher than the energy of the continuous stimulating light. For instance, the energy for stimulation becomes the same, if the pulse stimulating light of a duty 0.5 has an energy as much as twice the energy of the continuous stimulating light. The energy for stimulation becomes the same, if the pulse stimulating light of a duty 0.1 has an energy as much as ten times the energy of the continuous stimulating light. Accordingly, the pulse of stimulating light having a small duty and a large energy can sufficiently stimulate the phosphor at a relatively short time, and the phosphor in one pixel is instantly stimulated. This means that the adverse effect of lateness of emission appearing from the storage panel is reduced.

As described hereinbefore, it is preferred that the sampling period (that correspond to detecting period) T for one pixel satisfies the following conditions:

$$0.7 \times \tau \leq T \leq 1.7 \times \tau \text{ (specifically, } 0.7 \times \tau \leq T \leq 1.3 \times \tau)$$

in which $\tau$ stands for a response rate of the stimulable phosphor.

If T is longer than the upper limit, the effect of using the pulse is minimized, While T is shorter than the lower limit, a response is delayed and a satisfactory radiation image cannot be reproduced. For instance, in the case of using a stimulable phosphor showing a response rate of $0.8\mu$ sec. and setting the sample period as $1\mu$ sec for one pixel, the period required for reading 20 million pixels is approximately 20 seconds under the condition of a scanning duty 100%.

The electric signal (analogue signal) S which is output from the photomultiplier 20 is logarithmically converted in a log conversion circuit 22 and is passed through a low-pass filter 23 to remove noise. In the low-pass filter 23, components having a frequency (i.e., cut-off frequency) lower than the sampling frequency and higher than a half of the sampling frequency from the analogue signal S, and hence the noise is received. Otherwise, a signal emitted in the pixel upon application of a pulse of stimulating light is integrated in an integration circuit.

The analogue signal S is it into a sample hold (S/H) circuit 24, sampled at a timing synchronous with each pulse of the stimulating light 16, and held in the circuit.

Alteratively, the cut-off frequency in the low-pass filter 23 is shifted to a higher range, and the sampling is performed at a higher sampling frequency, namely, over-sampling.

The analogue signal held in the circuit 24 is converted into a digital signal in an analogue-digital (A/C) converter 25, and a digital image signal $S_o$ is transmitted. The digital image signal $S_o$ is input into an image-processing apparatus (not show), and subjected to necessary image processing.

Thus processed digital image signal is then input into a display (not shown) to give a visible image.

The radiation image information-reading apparatus employed in the method of the invention is not limited to that illustrated in Fig. Various known constitutions of a light source, a light-collecting system provided between the light source and the radiation image storage panel, an optical system provided between the storage panel and the photo-sensor, and a photo-sensor can be optionally employed in various combinations. For instance, laser sources which can oscillate a pulse of laser light such as solid laser, semi-conductor laser, electron beam-excitable laser, and dye laser can be employed in place of the combination of the continuous oscillating laser and ACM. Various photoelectric converter elements can be employed as the photo-sensor in place of the photomultiplier.

The radiation image storage panel is preferably moved almost perpendicularly to the scanning direction. However, as long as almost all of the surface of the storage panel is evenly exposed to the stimulating light, the storage panel may be moved diagonally or in zigzag.

The detection of the stimulated emission can be done from the back surface of the storage panel or from both of the surface an which the stimulating light is applied as well as its back surface.

The conversion of the analogue signal having been output from the photomultiplier can be done in different manners. Thus, the log conversion circuit can be omitted.

For linear scanning, a combination of a linear light source and a line sensor can be employed. As the linear light source, a fluorescent lap, a cold cathode fluorescent rescent lamp and a LED (light-emitting diode) array can be used. Examples of the line sensors include an amorphous silicon sensor, a CCD sensor, a CCD with back illuminator and MOS image sensor. The line sensor may consist of two or three rows of photoelectric converting elements, as well as a single row of the elements.

The relationship between the response period $\tau$ and the reading period T in the linear scanning is equivalent to that of the dot scanning.

What is claimed is:

1. A method for reading radiation image information from a radiation image storage panel comprising stimulable phosphor in which a radiation image information is recorded which comprises the steps of: moving the radiation image storage panel on a plane of the storage panel with scanning on the storage panel in a direction perpendicular to the movement of the storage panel a pulse of stimulating light having a duty in the range of 0.01 to 0.5, the duty meaning a ratio of a period of application of the stimulating light to a period of application of the stimulating light plus a period of applying no stimulating light; continuously detecting photoelectrically a stimulated emission appearing from the storage panel on the scanned surface and/or a back surface thereof to obtain electric signals; sampling the electric signals at a timing synchronous with the scanned pulse of stimulating light; and obtaining signals representing the radiation image information from the sampled electric signals.

2. The method of claim 1, wherein a period of the sampling T for one pixel is defined b the following formula:

$$0.7 \times \tau \leq T \leq 1.7 \times \tau$$

in which $\tau$ stands for a response rate of the stimulable phosphor.

3. The method of claim 1, wherein a period of the sampling T for one pixel is defined by the following formula:

$$0.7 \times \tau \leq T \leq 1.3 \times \tau$$

in which $\tau$ stands for a response rate of the stimulable phosphor.

4. The method of claim 1, wherein the pulse of stimulating light is applied onto the storage panel to form plural dots, and the stimulated emissions appearing from the storage panel are detected sequentially.

5. The method of claim 4, wherein the stimulated emissions appearing from the storage panel are sequentially detected by means of a photoelectric multiplier.

6. The method of claim 1, wherein the pulse of stimulating light is applied onto the storage panel to form lines, and the stimulated emission appearing from the storage panel is one-dimensionally detected.

7. The method of claim 6, wherein the stimulated emission appearing from the storage panel is one-dimensionally detected by means of a line sensor comprising plural photoelectric conversion elements aligned linearly.

8. The method of claim 1, wherein the photoelectrically detected electric signals are subjected to signal processing utilizing a low-pass filter or an integration circuit.

* * * * *